(12) United States Patent
Suzuki et al.

(10) Patent No.: US 6,955,161 B2
(45) Date of Patent: Oct. 18, 2005

(54) CHARGE-INJECTED INTERNAL COMBUSTION ENGINE, AND METHOD OF OPERATING SAME

(75) Inventors: Masatoshi Suzuki, Saitama (JP);
Tsuyoshi Takizawa, Saitama (JP);
Shunji Akamatsu, Saitama (JP);
Mamoru Uraki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/840,759

(22) Filed: May 6, 2004

(65) Prior Publication Data

US 2004/0226534 A1 Nov. 18, 2004

(30) Foreign Application Priority Data

May 16, 2003 (JP) ............................ 2003-138235

(51) Int. Cl.[7] .............................................. F02M 23/00
(52) U.S. Cl. ....................................... 123/533; 123/478
(58) Field of Search ................................. 123/533, 531, 123/527, 478

(56) References Cited

U.S. PATENT DOCUMENTS 5,054,444 A * 10/1991 Morikawa ................... 123/295
5,148,788 A * 9/1992 Saikalis et al. ........ 123/339.27

FOREIGN PATENT DOCUMENTS

JP        2000-514150        10/2000

* cited by examiner

Primary Examiner—Mahmoud Gimie
(74) Attorney, Agent, or Firm—Carrier, Blackman & Associates, P.C.; William D. Blackman; Joseph P. Carrier

(57) ABSTRACT

A charge-injected internal combustion engine exhibits improved starting performance with charge-injection timing control. A charge-injected internal combustion engine has an air-fuel injection valve for directly injecting a compressed air-fuel mixture into a combustion chamber. The engine is also provided with an air pump, driven by the crankshaft for discharging compressed air, and a timing controller for setting injection timing of the air-fuel injection valve. When initial startup of the engine is detected, the controller sets the injection timing to the intake stroke. When the engine reaches a predetermined engine speed, or when the pressure of the injection air reaches a threshold pressure where injection of the air-fuel mixture is possible on the compression stroke, the timing controller switches the injection timing from the intake stroke to the compression stroke.

6 Claims, 11 Drawing Sheets

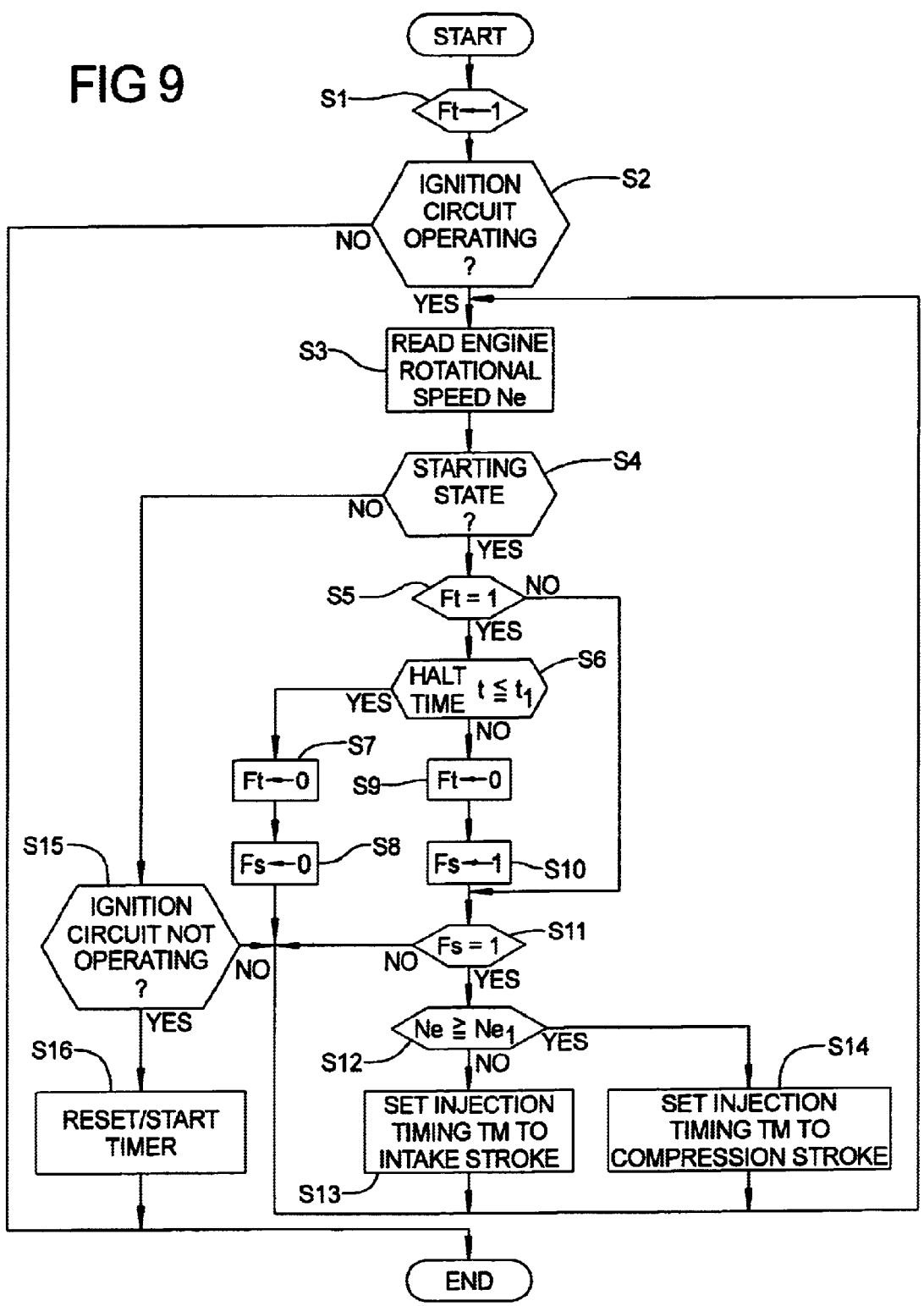

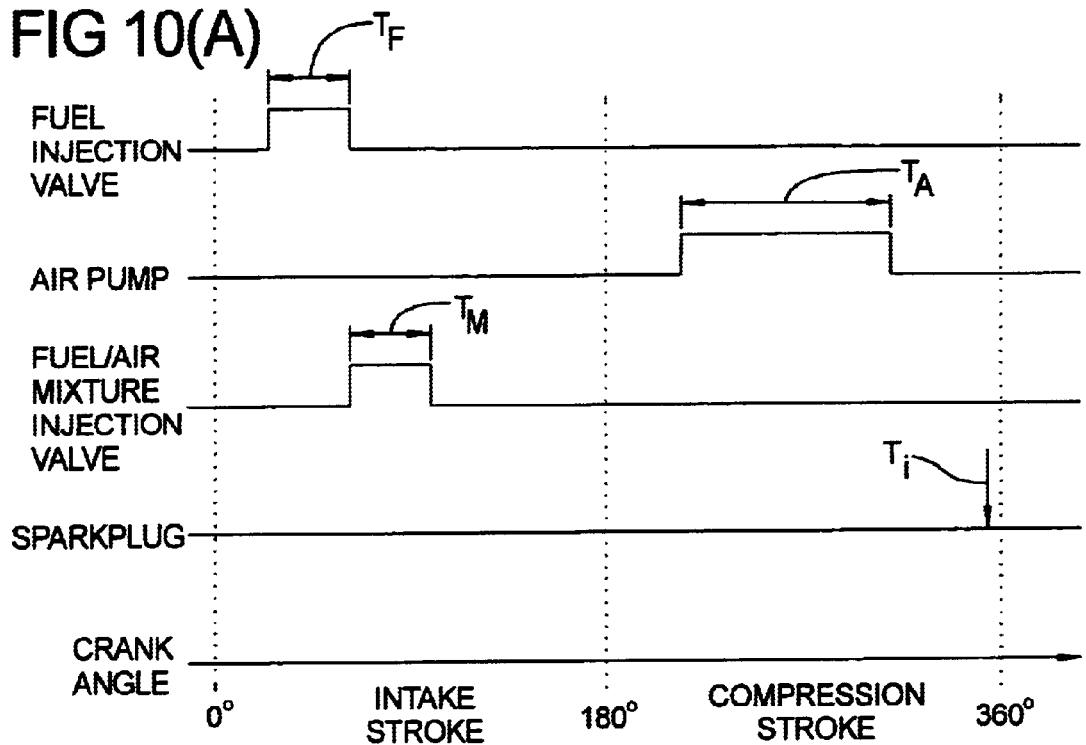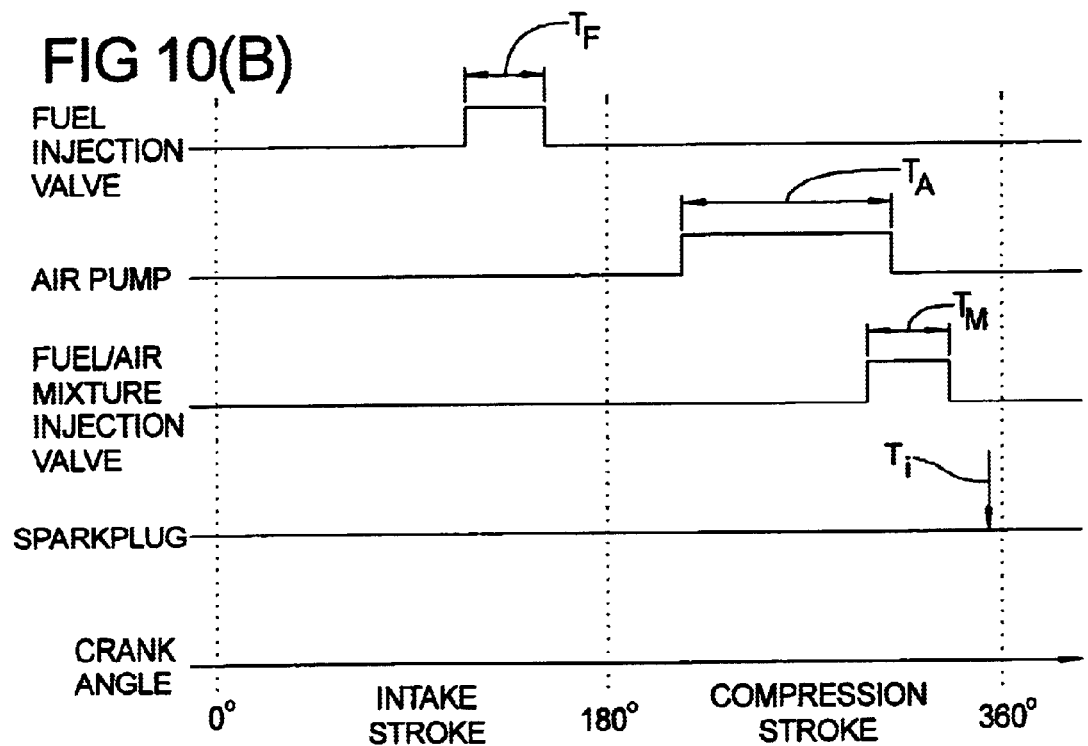

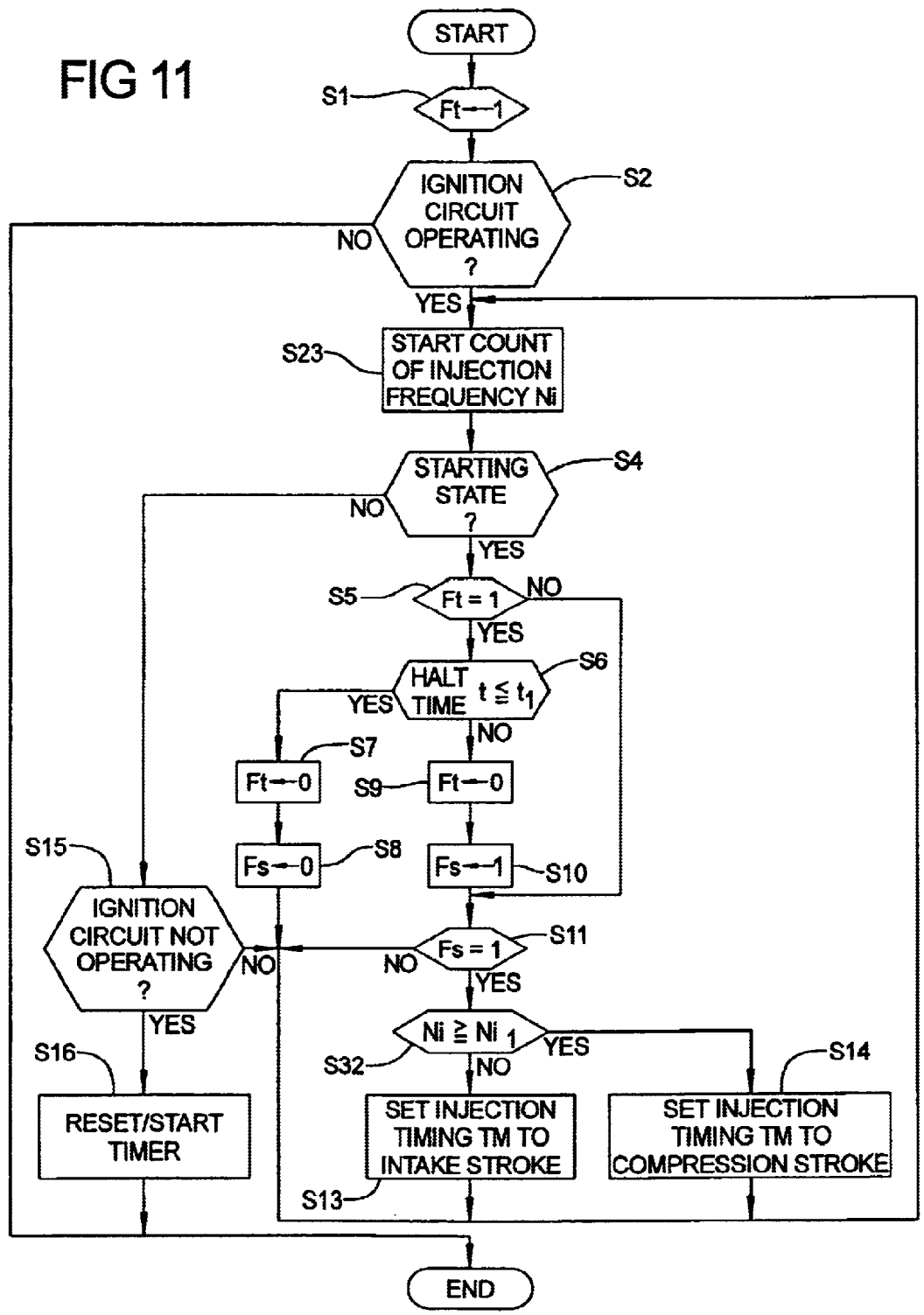

CHARGE-INJECTED INTERNAL COMBUSTION ENGINE, AND METHOD OF OPERATING SAME

CROSS-REFERENCE TO RELATED APPLICATIONS

The present application claims priority under 35 USC 119 based on Japanese patent application No. 2003-138235, filed May 16, 2003.

BACKGROUND OF THE INVENTION

1. Field of the Invention

The present invention relates to a charge-injected internal combustion engine equipped with a charge injection valve, for injecting a premixed air-fuel charge into a combustion chamber. More particularly, the present invention relates to a charge-injected internal combustion engine in which combustion air is compressed by an air pump driven by the engine crankshaft.

2. Background Art

A limited number of charge-injected internal combustion engines have previously been known. For example, a charge-injected engine is disclosed in Japanese Patent Publication No. 2000-514150. This internal combustion engine is equipped with an air-fuel injection unit for injecting a premixed air-fuel mixture directly into a combustion chamber, and an air compressor is driven by the engine crankshaft, in order to provide compressed air for the air-fuel injection unit.

In the engine described in the reference, fuel is mixed with compressed air from the air duct within the air-fuel injection unit, and the air-fuel mixture is injected into the combustion chamber. An internal combustion engine with good combustibility is therefore obtained, because a powerful airflow is formed, due to the injected compressed air, so as to promote atomization of the fuel.

However, at the time of starting up the internal combustion engine described in Japanese Patent Publication No. 2000-514150, and in particular, directly after the beginning of engine startup, the volume of compressed air discharged from the air compressor is small. Therefore, when the pressure of the compressed air within the air duct falls to ambient pressure, due to the internal combustion engine having been stopped for a long time, it is not possible to quickly provide compressed air at a sufficient pressure to convey the fuel within the cylinder.

Because the air flow of compressed air to the fuel injection unit is weak, it becomes difficult for the fuel to be atomized, combustibility falls, and starting performance is therefore lowered.

The internal combustion engine of Japanese Patent Document 2000-514150 opens a valve of the fuel injection unit of a cylinder on a compression stroke at the time of starting up, and increases the air pressure within the air cylinder by guiding compressed air to the fuel injection unit.

However, in the related technology, when the engine has not yet reached operating speed, compressed air at the time of the compression stroke bleeds outwardly from the cylinder via the fuel injection unit. The pressure within the cylinder therefore falls, and the starting performance of the internal combustion engine deteriorates. Further, it is necessary to control the timing of valve opening of the fuel injection unit, in order to increase the air pressure within the air duct. Control of the fuel injection unit therefore becomes complex, and cost is increased, in cases where a pressure sensor is required to detect the pressure within the intake air duct. Moreover, as there is a small amount of oil mixed in with the air within the cylinder bore, when the compressed charge from the cylinder bore flows outwardly from the cylinder in the reverse direction from normal flow, this oil adheres to, or accumulates as a deposit on the walls of an air passage within the fuel injection unit, and interferes with the flow of the compressed air.

Although the known charge-injected internal combustion engines are useful for their intended purposes, a need still exists in the art for a charge-injected internal combustion engine having improved startup operation. A need also exists for a charge-injected internal combustion engine having improved fuel efficiency.

SUMMARY OF THE INVENTION

In order to resolve the difficulties encountered in the known charge-injected engines, it is an object of the present invention to provide a charge-injected internal combustion engine with superior starting performance, using straightforward controls. It is a further object of the invention to economically produce a charge-injected engine, and it is yet another object to produce a charge-injected engine with improved fuel efficiency.

In a first aspect of the invention, a charge-injected internal combustion engine is provided including a base engine with a crankshaft, a cylinder, a piston, a camshaft, and an air-fuel injection valve for injecting an air-fuel charge into a combustion chamber. The engine also includes an air pump, driven by the crankshaft, which discharges compressed injection air, and a controller for timing operation of the air-fuel injection valve.

The control system includes an engine state sensor for detecting a state of the internal combustion engine, and under normal operating conditions, the controller sets the injection timing to the compression stroke of the internal combustion engine, according to the engine state detected by the engine state sensor. When the engine first starts, and the engine running state sensor detects a startup condition of the internal combustion engine, the injection timing is set to the intake stroke of the internal combustion engine, for an initial startup period.

According to this, at the time of starting up the internal combustion engine, when the rotary speed of the engine is low, so that the pressure of the injection air in the air-fuel injection valve is not sufficiently high to inject a fuel-air mixture on the compression stroke, the fuel-air mixture is injected from the air-fuel injection valve at the time of the intake stroke, so that the pressure within the internal combustion engine becomes negative pressure, drawing the charge into the engine cylinder bore. At this time, in addition to there being a negative pressure state within the combustion chamber, the injection air has a pressure that is higher than the relatively low pressure of atmospheric air, as a result of the compressed air being supplied from the air pump, and the difference in pressure between the pressure of the air-fuel mixture within the air-fuel injection valve and the pressure within the combustion chamber is therefore large, so as to promote atomizing of the fuel within the combustion chamber. A powerful airflow is therefore formed within the combustion chamber by high-pressure injection air injected together with the fuel from the air-fuel injection valve at the time of the compression stroke according to the engine state so as to promote atomizing of the fuel. Superior combustibility can therefore be attained, and a stratified combustion operation is possible.

As a result, according to the first aspect of the invention, the following results are obtained. In a charge-injected internal combustion engine where the injection timing to the combustion chamber of the air-fuel injection valve is set to the compression stroke according to the engine state, when starting of the internal combustion engine is first detected, the injection timing is set to the intake stroke. It is therefore possible to promote atomizing of the fuel within the combustion chamber, improve combustibility during starting, and improve starting performance. Further, since the valve remains closed during conditions of low air pressure at the time of the compression stroke, the likelihood of pressure leakage outwardly from the cylinder is minimized, and there is a reduced risk of the air path within the air-fuel injection valve becoming blocked up due to deposits. Further, by switching the injection timing of the air-fuel injection valve over to the compression stroke after engine warm-up, superior combustibility is obtained, and stratified combustion is possible.

In a second aspect of the invention, in the charge-injected internal combustion engine according to the first aspect, the engine running state sensor comprises a rotary speed sensor for detecting the rotary speed of the engine. After the engine warms up, and a prescribed engine rotating speed is attained, corresponding to reaching a threshold air pressure where injection of an air mixture is possible in the compression stroke by the rotary speed sensor, during starting control, the controller switches over the injection timing from the intake stroke to the compression stroke.

According to this, when pressure of the injection air reaches a threshold air pressure, the injection period is switched over from the intake stroke to the compression stroke, based on input from the rotary speed sensor, and the fuel is atomized, using high-pressure injection air, without having to use a pressure sensor for detecting pressure of the injection air.

As a result, according to the second aspect of the invention, in addition to the results of the invention disclosed in the first aspect, the following results are attained. A pressure sensor is therefore not required to detect pressure of the injection air within the intake duct. As a result, costs can be reduced, and atomizing of fuel can be carried out using high-pressure injection air so as to ensure good starting performance.

With the invention disclosed in a third aspect hereof the charge-injected internal combustion engine is such that, the engine state sensor comprises an injection frequency sensor for detecting injection frequency of the air-fuel injection valve, so that when the engine operation is detected by the injection frequency sensor to have reached a threshold prescribed injection frequency corresponding to reaching of a threshold air pressure where injection of an air mixture is possible in the compression stroke, the control system switches the injection timing from the intake stroke to the compression stroke.

According to this, when pressure of the injection air reaches a threshold air pressure, the injection period is switched over from the intake stroke to the compression stroke based on detection results of the injection frequency sensor. This operation is carried out using high-pressure injection air without having to use a pressure sensor for detecting pressure of the injection air. As a result, according to the third aspect of the invention, the same results are attained as for the invention according to the second aspect.

In the invention of a fourth aspect hereof, with the charge-injected internal combustion engine according to the first aspect, the engine state sensor includes a shutdown timer for measuring a time of halting the internal combustion engine, so that when the halt time detected by the shutdown timer is at or below a prescribed halt time range, corresponding to a state where pressure of the injection air is greater than a basic air pressure, and where injection of the air mixture is possible in the compression stroke when starting of the internal combustion engine is detected by the engine state sensor, the controller sets the injection timing to the compression stroke. Conversely, when the halt time exceeds the prescribed halt time, control during starting is executed, and the injection timing is initially set to the intake stroke.

According to this, in a case where the halt time is short, and the engine remains warm, there is substantially very little or no drop in pressure of the injection air due to leaking of compressed air from between slight gaps existing in the air supply system etc. from the air pump to the air-fuel injection valve. When the pressure of the injection air remains greater than the basic air pressure at the starting timing, air-fuel mixture can be injected in the compression stroke without executing control during starting. A powerful airflow is therefore formed within the combustion chamber by injection air of a pressure greater than the basic air pressure and fuel atomizing is promoted. It is therefore possible to obtain superior combustibility and stratified combustion operation is possible directly after startup with a warm engine.

As a result, according to the fourth aspect of the invention, in addition to the results of the invention disclosed in the first aspect, the following results are attained. Namely, even when an internal combustion engine is in a start state, when the halt time of an internal combustion engine is within a prescribed halt time, it is possible to improve combustibility by carrying out injection of an air-fuel mixture using high-pressure injection air without carrying out control during starting, superior starting performance is ensured, and the start timing of a stratified combustion operation is made to come about more quickly, so that fuel consumption is improved.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 9 is a flowchart illustrating a routine for control during starting for injection timing of an air-fuel mixture valve of the internal combustion engine of FIG. 1.

FIG. 10(A) is a schematic view illustrating injection timing for an air-fuel mixture valve and fuel injector of the internal combustion engine of FIG. 1, discharge timing of an air pump, and ignition timing, for when the air-fuel injection valve injects an air-fuel mixture on the intake stroke;

FIG. 10(B) is a schematic view illustrating injection timing for an air-fuel mixture valve and fuel injector of the internal combustion engine of FIG. 1, discharge timing of an air pump, and ignition timing, for when the air-fuel injection valve injects an air-fuel mixture on the compression stroke; and FIG. 11 is a flowchart illustrating a routine for control during starting for injection timing of an air-fuel mixture valve of a multi-charge-injection-type internal combustion engine according to a further embodiment of the present invention.

DETAILED DESCRIPTION

In the following discussion, descriptions of selected illustrative embodiments of the present invention are given, with reference to the drawings. It should be understood that the following description is intended to illustrate, rather than to limit the invention. Herein, only structures considered necessary for clarifying the present invention are described. Other conventional structures, and those of ancillary and auxiliary components of the system, are assumed to be known and understood by those skilled in the art.

Figure 1:
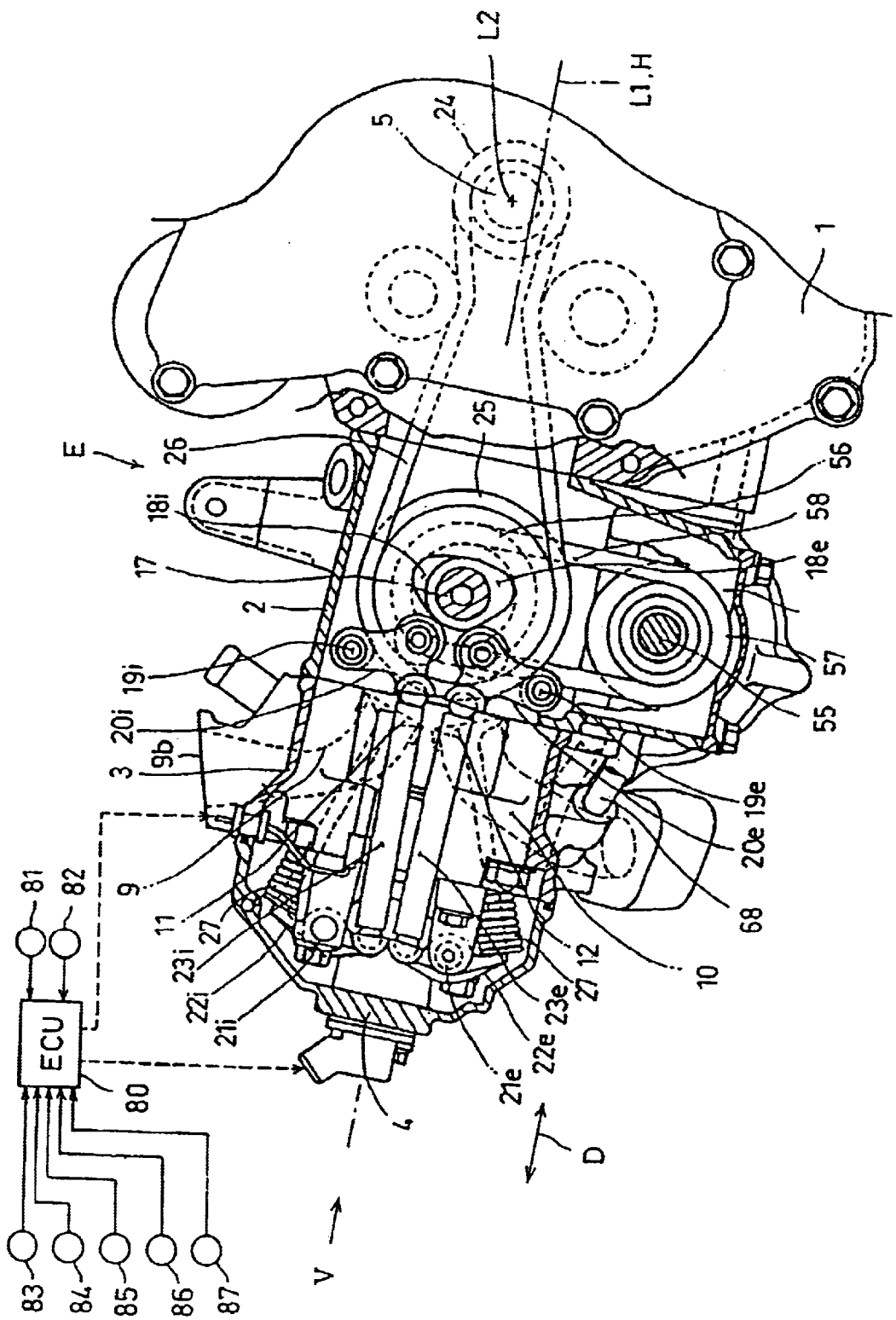
FIG. 1 is a partial cross-sectional view of a multi-cylinder charge-injection internal combustion engine constituting an embodiment of the present invention, taken along a plane orthogonal to a central line of rotation L2 of a crankshaft of the engine, and is as viewed from I of FIG. 3 and FIG. 5.
Figure 2:
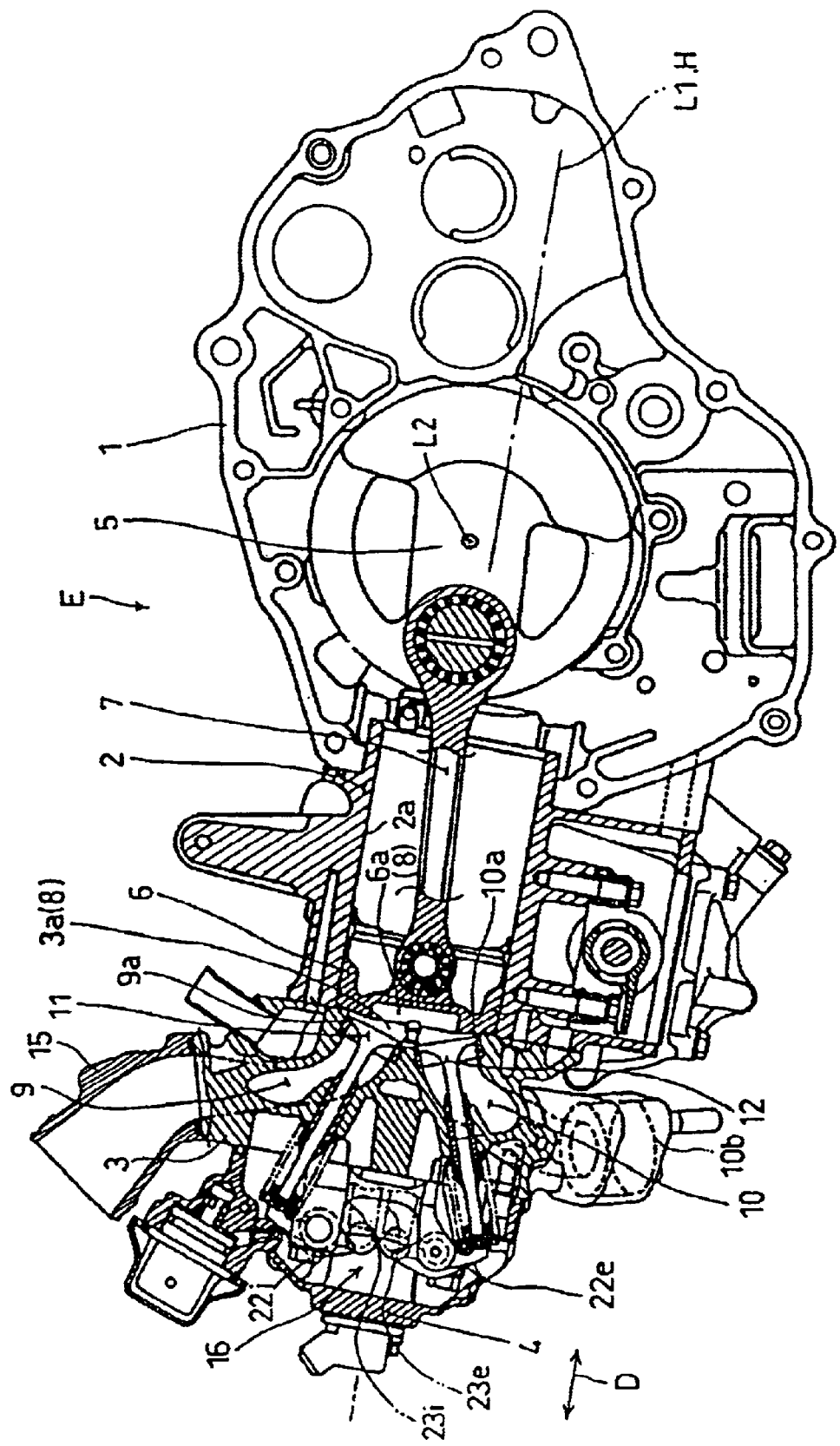
FIG. 2 is a cross-sectional view of the internal combustion engine of FIG. 1, taken along a plane perpendicular to a central line of rotation of a crankshaft containing a cylinder axis line for a crankcase and cylinder, as viewed from II—II of FIG. 5 for a cylinder head.
Figure 3:
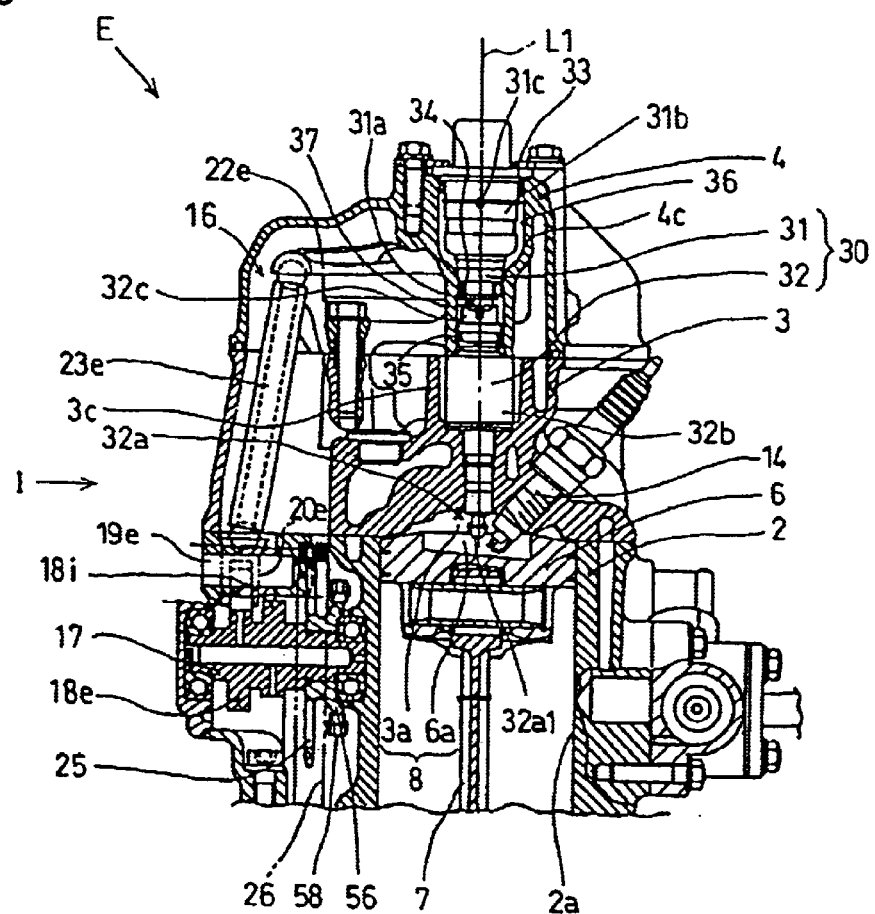
FIG. 3 is a cross-sectional view of the internal combustion engine of FIG. 1, as viewed from III—III of FIG. 5.

Referring now to FIGS. 1 to 3, a charge-injected internal combustion engine E, to which a first selected illustrative embodiment of the present invention is applied, is a water-cooled, single-cylinder four-stroke internal combustion engine. The engine E is adopted to be mounted on a vehicle such as a motorcycle, and is equipped with an engine body comprised of a crankcase 1 forming a crank chamber housing a crankshaft 5, a cylinder 2 connected to an upper end of the crankcase 1, a cylinder head 3 coupled to the upper end of the cylinder 2, and a valve cover 4 coupled to an upper end of the cylinder head 3.

The internal combustion engine E is adapted to be oriented so that the crankshaft 5 extends transversely in a direction from left to right of the vehicle (vehicle width direction), so as to be suspended on the vehicle in a state where the cylinder 2 positioned to the front of the vehicle with respect to the crankshaft 5 is inclined slightly upwards with respect to the vehicle (refer to FIG. 1 and FIG. 2).

In this embodiment, with regards to the body of the internal combustion engine E, in the direction D of a cylinder axis L1, an upward direction is the direction where the cylinder head 3 is positioned with respect to the cylinder 2.

A piston 6, fitted so as to be reciprocally moveable in a cylinder bore 2a of the cylinder 2, is coupled to the crankshaft 5 and supported in a rotatable manner at the crankcase 1 via a connecting rod 7. A combustion chamber 8 (FIG. 2) is defined between the piston 6 and the cylinder head 3, and is constituted of a recess 3a formed at the lower surface of the cylinder head 3 and a cavity 6a formed at the top surface of the piston 6.

Figure 4:
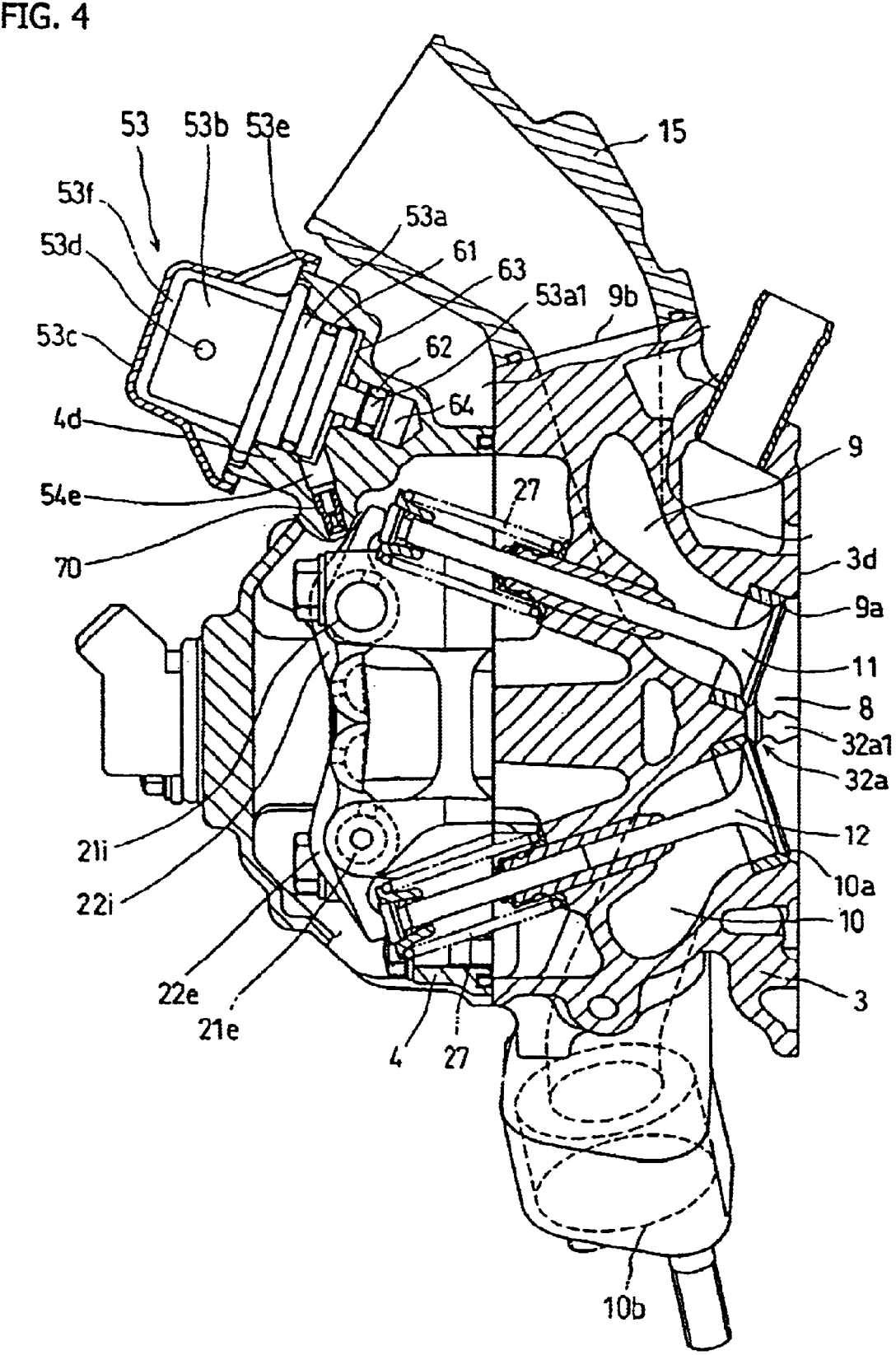
FIG. 4 is an enlarged view of essential parts of a cylinder head and valve cover of FIG. 2, and is a cross-sectional view from IV—IV of FIG. 8 of the vicinity of an air pressure regulator.

Referring to FIG. 4, an intake port 9, having a pair of intake openings 9a opening at the combustion chamber 8, and an exhaust port 10 having a single exhaust opening 10a opening at the combustion chamber 8, are formed at the cylinder head 3. The respective intake and exhaust ports 9, 10 are provided with a pair of intake valves 11 opening and closing the pair of intake openings 9a, and a single exhaust valve 12 opening and closing the exhaust opening 10a, respectively. As best seen in FIG. 3, an air-fuel injection valve 30 and spark plug 14 are mounted on the cylinder head 3, and are fitted with their respective tips each extending into the combustion chamber 8.

The air-fuel injection valve 30 is arranged at a substantially central part of the combustion chamber 8 as viewed from a cylinder axis line direction D, so as to have an axial line of substantially the same axis as that of the cylinder axle L1, in order to directly inject a fuel-air mixture, consisting of fuel and compressed air, into the combustion chamber 8. The intake valves 11, the exhaust valve 12 and the spark plug 14 are all arranged spaced apart in a circumferential direction about the periphery of the air-fuel injection valve 30, taking the air-fuel injection valve 30 as a central component.

An intake pipe 15 of an intake system having an air cleaner 51 (refer to FIG. 7) and a throttle body is connected to a side surface of the intake side of the cylinder head 3 so as to communicate with an inlet 9b of the intake port 9 opens. An exhaust pipe of an exhaust device is connected to the side surface of an exhaust side of the cylinder head 3 at which an outlet 10b of the exhaust port 10 opens.

Here, intake side refers to the side where the intake port 9 is positioned with respect to a plane H (FIG. 2) parallel with a rotation center line L2 of the crankshaft 5 containing the cylinder shaft line L1 at the engine body. Similarly, exhaust side refers to the side where the exhaust port 10 is positioned with respect to the plane H at the engine body.

Basic Engine Operation

Intake air, provided from the intake system, via the intake pipe 15, is drawn from the intake ports 9 into the combustion chamber 8 via the pair of opened intake valves 11 when the piston is on the downward intake stroke. After being compressed by the rising piston 6 on a mixture of air and fuel, injected into the combustion chamber 8 from the air-fuel injection valve 30, the compression stroke, is ignited by a spark from the spark plug 14. After the mixture is ignited, rapidly expanding gas, generated by combustion of the air-fuel mixture, forces the piston 6 downwardly on the expansion stroke, rotating the crankshaft 5 via the connecting rod 7.

On the exhaust stroke, the combusted gas is exhausted from the combustion chamber 8 through the exhaust port 10 as exhaust gas, via the open exhaust valve 12, and is further exhausted to the outside via the exhaust system.

Referring to FIG. 1 to FIG. 5, a valve assembly 16 for opening and closing the intake valves 11 and the exhaust valve 12 includes a cam shaft 17, an intake cam 18i, and an exhaust cam 18e supported in a rotatable manner at side parts of the cylinder 2. The valve assembly 16 also includes an intake cam follower 20i for making contact with the intake cam 18i and an exhaust cam follower 20e for making contact with the exhaust cam 18e, respectively supported in a swingable manner at a pair of support shafts 19i, 19e supported at the cylinder 2. The valve assembly 16 further includes a pair of intake rocker arms 22i making contact with tips of valve stems of the pair of intake valves 11, and an exhaust rocker arm 22e making contact with the tip of a valve stem of the exhaust valve 12 supported respectively in a swingable manner at a pair of rocker shafts 21i, 21e supported at the cylinder head 3. The valve assembly 16 still further includes a pair of rods 23i, 23e, making contact with the ends of the cam follower 20i and exhaust cam follower 20e and the intake rocker arm 22i and exhaust rocker arm 22e, and transmitting the rocking action of the cam follower 20i and the exhaust cam follower 20e to the intake rocker arm 22i and exhaust rocker arm 22e.

As shown in FIG. 1, the cam shaft 17 is rotatably driven at a rotary speed that is half the rotary speed of the crankshaft 5 by driving force of a crankshaft 5, transmitted via a transmission mechanism containing a drive sprocket 24 provided at the crankshaft 5, a cam sprocket 25 provided at the cam shaft 17, and a timing chain 26 spanning the sprockets 24 and 25. The intake cam 18i and the exhaust cam 18e, rotating together with the cam shaft 17, open and close the intake valves 11 and the exhaust valve 12 urged in a valve-closing direction by a valve spring 27 at prescribed opening and closing timings in synchronization with rotation of the crankshaft 5 via the intake cam follower 20i and the exhaust cam follower 20e, a pair of rods 23i, 23e, the intake rocker arms 22i, and the exhaust rocker arm 22e.

The Air-fuel Injection Valve

Figure 6:
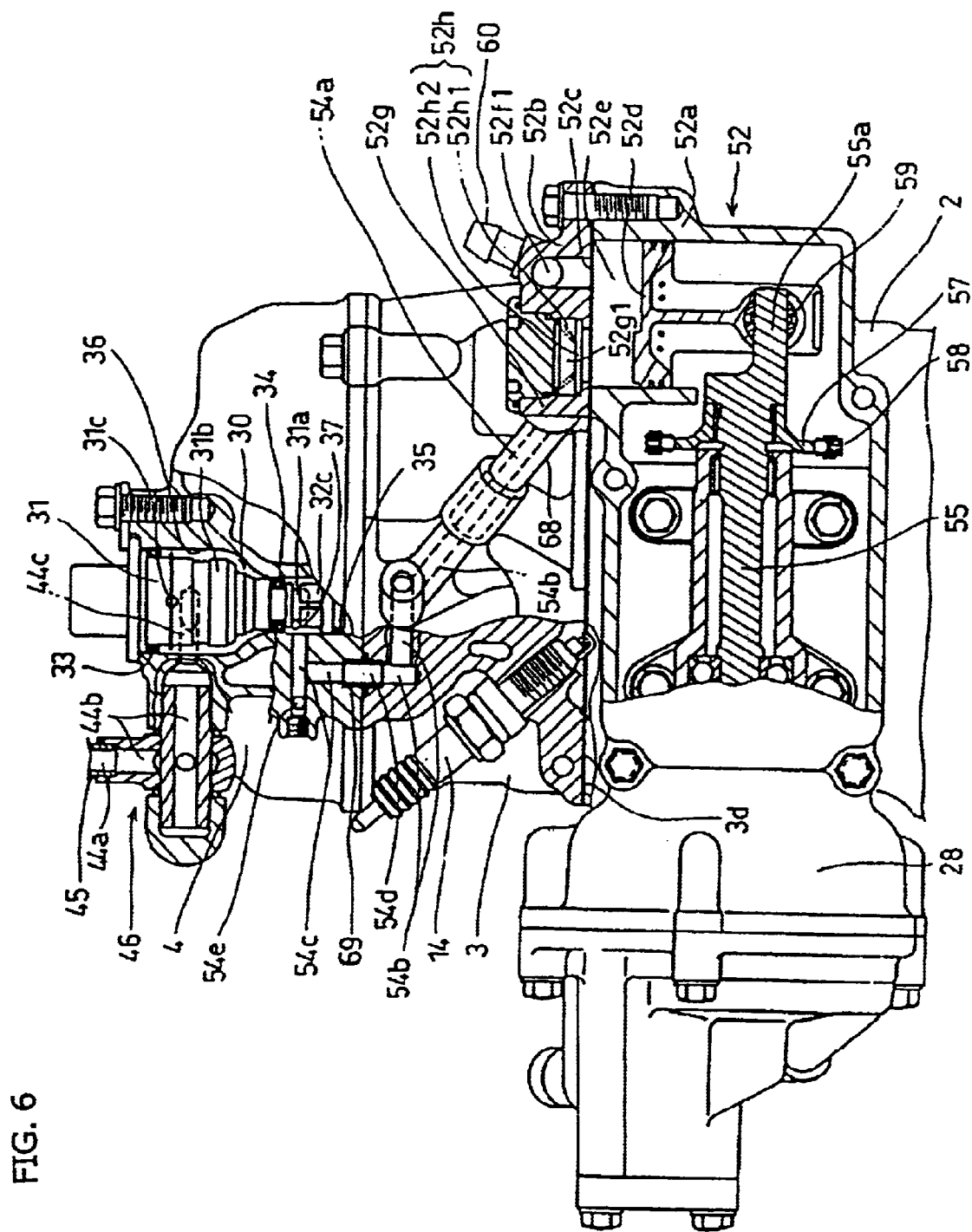
FIG. 6 is a partial cross-sectional view of the internal combustion engine of FIG. 1, mainly as viewed from VI—VI of FIG. 5 of essential parts.

Referring to FIG. 3 and FIG. 6, the air-fuel injection valve 30, fitted so as to extend between the cylinder head 3 and the valve cover 4, directly injects an air-fuel charge, formed of intermixed fuel and compressed injection air, into the cavity 6a of the combustion chamber 8.

The air-fuel injection valve 30 includes a fuel injector 31 and a charge injection valve 32. The fuel injector 31 is inserted into an insertion tube 4c formed on the valve cover 4, for injecting fuel provided via a fuel supply system 40 (refer to FIG. 7). The charge injection valve 32 is inserted into an insertion tube 3c formed in the cylinder head 3, and is provided for injecting a charge containing a mixture of fuel from the fuel injector 31 and injection air provided via an air supply system 50 (refer to FIG. 7), outwardly from a nozzle 32a and into the combustion chamber 8. The charge injection valve 32 operates by a valve body 32a1 opening and closing a nozzle valve to regulate flow through a hole formed in the tip of the nozzle 32a.

An annular fuel chamber 36 (FIG. 6) sealed by a pair of annular seals 33, 34 fitted about the outer periphery of a valve body 31b of the fuel injector 31 is formed so as to substantially surround and encompass the valve body 31b. Fuel is supplied to the fuel chamber 36 from the fuel supply system 40.

An annular air chamber 37 (FIG. 3), sealed by a seal 34 and an annular seal 35 fitted about the outer periphery of the valve body 32b of the charge injection valve 32 is formed so as to encompass a nozzle section 31a of the fuel injector 31 and an air introducing section 32c for the charge injection valve 32 formed between the insertion tube 4c, fuel injector 31 and charge injection valve 32. Compressed air from the air supply system 50 is supplied as injection air at the air chamber 37.

The amount of fuel contained in the air-fuel mixture injected from the air-fuel injection valve 30, injection timing TM (refer to FIG. 10) of the air-fuel injection valve 30 and the injection amount are set by an electronic controller (hereinafter referred to as ECU) 80 (refer to FIG. 1) taken as a controller according to engine conditions such as engine load of the internal combustion engine E, engine rotary speed Ne, and engine temperature etc. detected by an engine state sensor (described later). Further, spark timing Ti (refer to FIG. 10) of the spark plug 14 is also controlled by the ECU 80 according to the sensed engine states.

The fuel injector 31 and the charge injection valve 32 each include a respective solenoid valve, driven to open and close by a signal from the ECU 80. The fuel injector 31 injects fuel flowing from the fuel chamber 36 through a fuel introduction opening 31c formed in the valve body 31b, from the nozzle section 31a through the air introducing section 32c and into the valve body 32b of the charge injection valve 32, at an injection timing TF (refer to FIG. 10) and fuel amount set by the ECU 80 according to the engine states. Subsequently, the charge injection valve 32 injects an air-fuel charge, consisting of intermixed fuel and compressed injection air from within the valve body 32b, from the facing nozzle section 32a within the combustion chamber 8 towards the cavity 6a, at an injection timing and injection amount determined by the ECU 80.

Fuel Supply System

Figure 7:
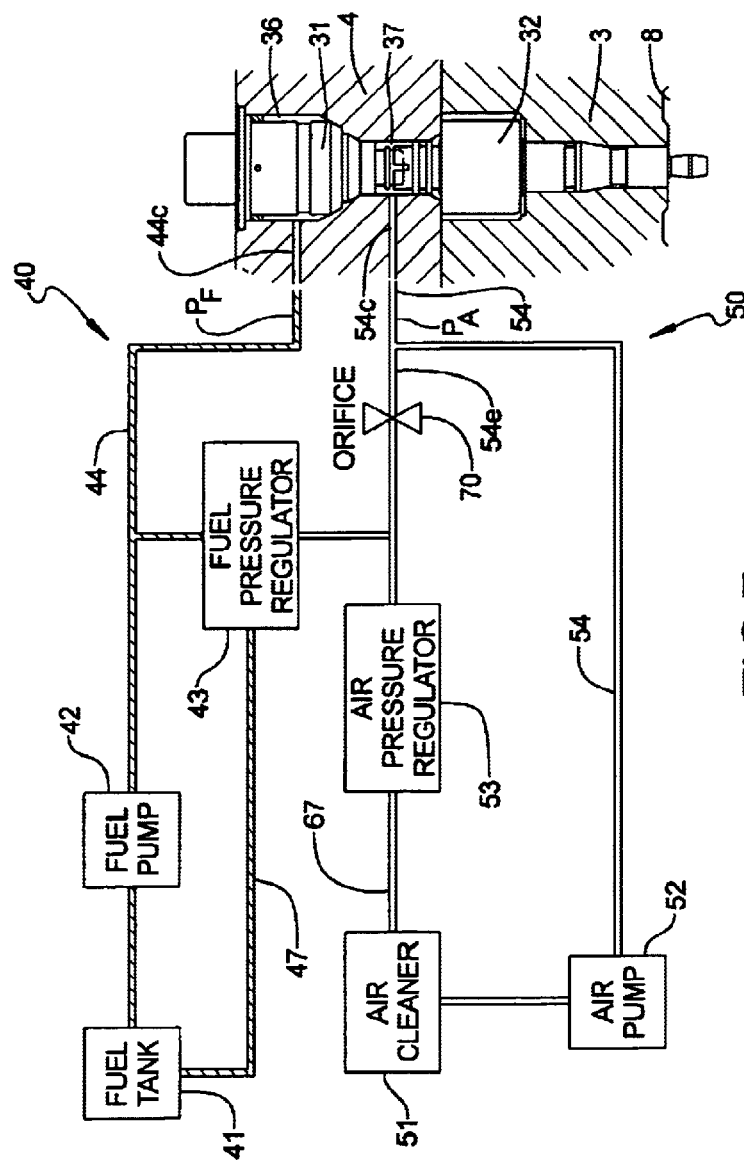
FIG. 7 is a schematic view illustrating a fuel supply system and air supply system for an air-fuel mixture valve of the internal combustion engine of FIG. 1.
Figure 8:
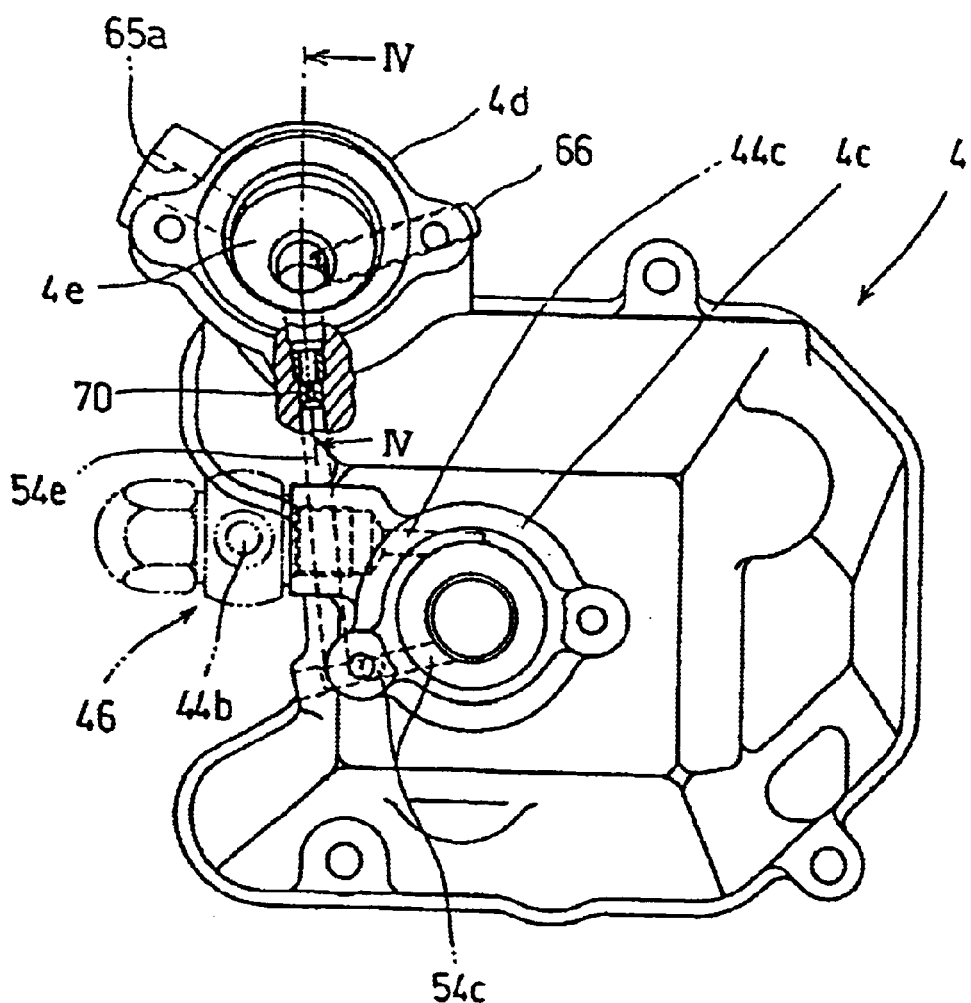
FIG. 8 is a bottom plan view of the valve cover of the internal combustion engine of FIG. 1, as viewed from VIII of FIG. 1.

Referring to FIG. 7, the fuel supply system 40 is comprised of an electric-powered fuel pump 42 for force-feeding liquid fuel pumped from a fuel tank 41 at high-pressure, a fuel pressure regulator 43 for regulating pressure of fuel supplied from the fuel pump 42 to the fuel chamber 36 to a set fuel pressure PF, and a fuel passage system 44 communicating with the fuel pump 42, fuel pressure regulator 43 and fuel chamber 36. Referring to FIG. 6 and FIG. 8, fuel at the set fuel pressure PF is supplied to the fuel chamber 36 via a fuel passage 44c comprised of holes formed in the valve cover 4 via a fitting 46 to which a pipe 45 is connected. Fuel passages 44a, 44b and a fuel passage 44c formed respectively by the pipe 45 and the fitting 46 constitute part of the fuel passage system 44. Surplus fuel of the fuel discharged from the fuel pump 42 is returned to the fuel tank 41 from the fuel pressure regulator 43 via a return fuel passage 47.

Air Supply System

Figure 5:
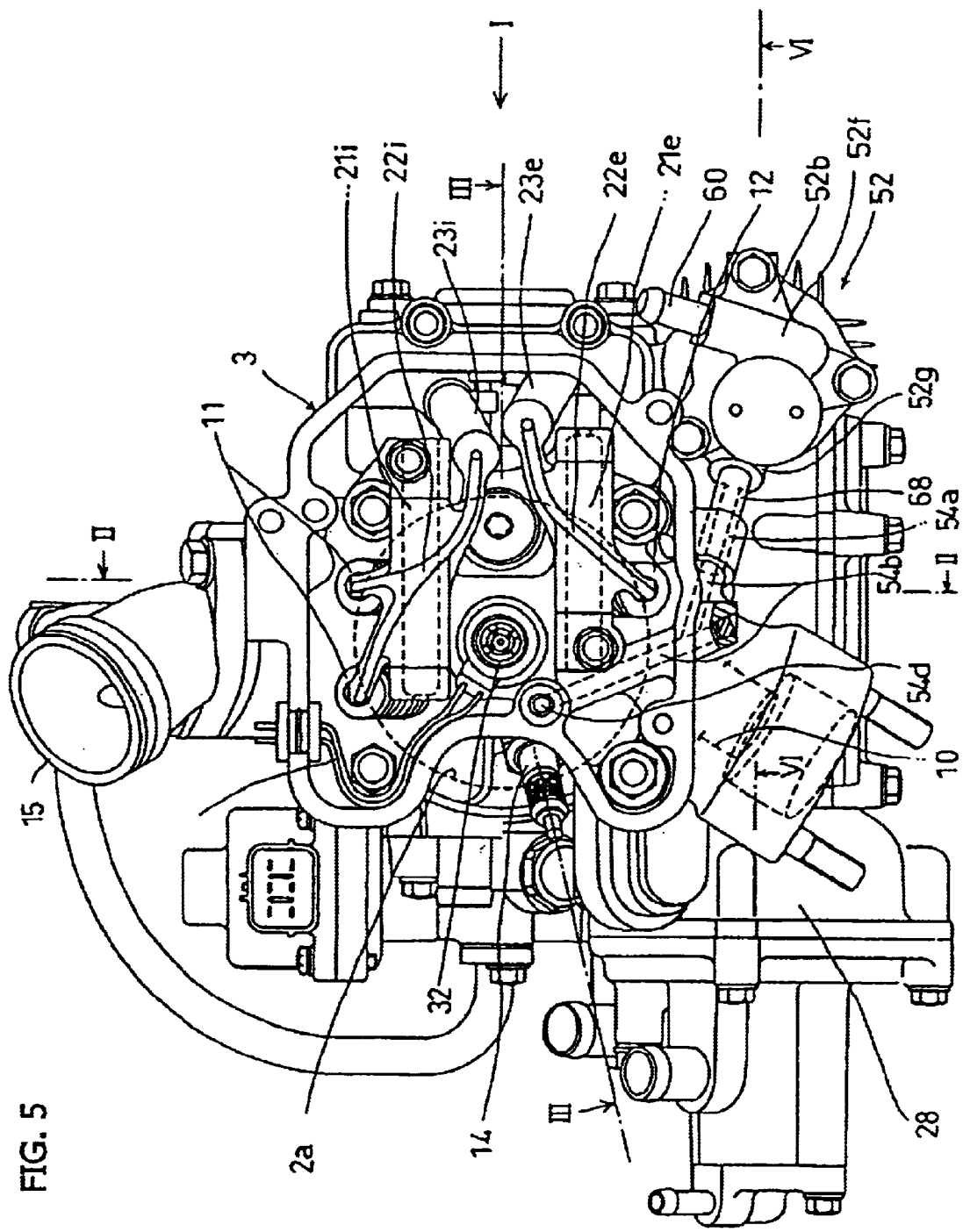
FIG. 5 is a top plan view of the internal combustion engine of FIG. 1, as viewed from V of FIG. 1 and with the valve cover deleted from the drawing for purposes of illustration.

Referring to FIG. 5 to FIG. 7, the air supply system 50 is comprised of an air pump 52 discharging air drawn in from an air cleaner 51 of the intake device driven by the power of the crankshaft 5, an air pressure regulator 53 for regulating the pressure of the injection air constituted by the compressed air discharged from the air pump 52 supplied to within the air chamber 37 to a set air pressure PA, and an air passage system 54 communicating with the air pump 52, air pressure regulator 53, and air chamber 37. The set air pressure PA is a pressure capable of enabling injection of an air-fuel mixture from the air-fuel injection valve 30 in the compression stroke and preferably in the latter half of the compression stroke, and is set to be a pressure that is as low as possible to enable injection of the air-fuel mixture in the compression stroke while being higher than a basic air pressure PA0.

Structure and Operation of the Air Pump

The air pump 52 provided at the exhaust side of the cylinder 2 is a displacement-type reciprocal-type pump for discharging compressed air of a pressure higher than the set air pressure PA at a discharge timing TA described later and is comprised of a pump body 52a formed integrally with the cylinder 2, a pump cover 52b coupled via a gasket 52c constituted by a thin plate at the pump body 52a, a rotating shaft 55 rotatably drive by the force of the crankshaft 5 supported in a rotatable manner at the cylinder 2, and a piston 52d coupled to the rotating shaft 55 forming a pump chamber 52e with a pump cover 52b inserted in a manner capable of reciprocal movement at the pump body 52a.

An intake section formed from an intake path 52f1 provided with an intake valve comprised of a reed valve taking part of a gasket 52c as a reed body and a discharge section 52g formed with a discharge path 52g1 provided with a discharge valve 52h having a valve body 52h1 urged by a spring 52h2 are formed at the pump cover 52b. Referring to FIG. 1 and FIG. 3, the rotating shaft 55 is rotatably driven at the same speed as the cam shaft 17 by power of the crankshaft 5 transmitted via a transmission mechanism comprised of a drive sprocket 56 provided at the crankshaft 5, a driven sprocket 57 provided at the rotating shaft 55 and a transmission chain 58 spanning the sprockets 56, 57.

The pump cover 52b and the discharge section 52g are, as a whole, arranged next to the exhaust side of the cylinder head 3, are positioned to the side of the cylinder head 3 from a joining surface 3d, and the uppermost end of the pump chamber 52e is positioned substantially above the joining surface 3d. Further, the whole of the air chamber 37 is positioned more towards the air pump 52 than the fuel chamber 36.

The air pump piston 52d is coupled to the rotating shaft 55 via a Scotch yoke mechanism. Specifically, the air pump piston 52d is coupled via a sliding piece 59 fitting in a sliding manner into a columnar guide hole formed at the piston 52d to an eccentric shaft 55a provided eccentrically from a centerline of rotation of the rotating shaft 55 at one end of the rotating shaft 55, so as to be made to move in a reciprocal manner in an axial direction of the pump body 52a within the pump body 52a due to rotation of the rotating shaft 55. A transmission mechanism for rotatably driving an impeller of a cooling water pump 28 is provided at the other end of the rotating shaft 55.

Air drawn into the pump chamber 52e from the intake path 52f1 via the a fitting 60 to which a pipe communicating with the air cleaner 51 is connected is compressed to a high pressure by the piston 52d, the discharge valve 52h is opened, and the air is discharged at the discharge path 52g1 as compressed air.

Air Pressure Regulator

Referring to FIG. 4 and FIG. 8, the air pressure regulator 53 is fitted to the valve cover 4 so as to be partially contained in a storage section 4d integrally formed at an intake side of the valve cover 4. The air pressure regulator 53 is comprised of a first case 53a contained in a storage chamber 4e formed at the storage section 4d and a second case 53b positioned at an outside part of the storage chamber 4e so as to be covered by a cover 53c. An air introduction chamber 63 sealed by a pair of annular seals 61, 62 fitted to the first case 53a so as to encompass the first case 53a between the seals 61 and 62 and a return air chamber 64 encompassing an air discharge section 53a1 of the first case 53a between the seal 62 and the bottom of the storage section 4d are formed between the storage section 4d and the first case 53a. At the return air chamber 64, surplus air discharged from the air pressure regulator 53 during pressure regulation is guided along the air discharge section 53a1.

An air guide hole 53d for guiding outside air as fluid having standard pressure during correction of the set air pressure PA is formed at the second case 53b. The outside air flows from a gap 53e formed between the storage section 4d and the cover 53c into a gap 53f formed between the second case 53b and the cover 53c so as to flow into the air pressure regulator 53 from the air guide hole 53d opened in the gap 53f.

Referring to FIG. 7, the air introduction chamber 63 guides air having the set air pressure PA taken as a fluid having a reference pressure during correction of the set fuel pressure PF of the fuel pressure regulator 43 according to the pressure within the air chamber 37 so that the air communicates with the fuel pressure regulator 43 via an air passage partially constituted by a passage 65a formed at the storage section 4d. Further, the return air chamber 64 communicates with the air cleaner 51 via a return air path 67 formed from a fitting 66 fitted to the storage section 4d and piping (not shown) connected to the fitting 66, etc. Surplus air of compressed air discharged from the air pump 52 is circulated back to the air cleaner 51 from the air pressure regulator 53 via the return air path 67.

Air Routing

Referring to FIG. 5 to FIG. 8, the air passage system 54 is comprised of an air passage 54a formed by a pipe 68 connected to an outlet of the discharge path 52g1 of the pump cover 52b, a head-side air passage 54b comprised of a hole formed in the cylinder head 3, a cover-side air passage 54c comprised of a hole formed in the valve cover 4, a connection air passage 54d formed from a hollow positioning pin 69 provided at the surface where the cylinder head 3 and the valve cover 4 join in order to connect the head-side air passage 54b and the cover-side air passage 54c, and a branching air passage 54e branching from the cover-side air passage 54c.

The branching air passage 54e comprised of a hole formed in the valve cover 4 communicates with the air chamber 37 and the air pressure regulator 53 via the cover-side air passage 54c. An orifice 70 (refer also to FIG. 4) is provided at the branching air passage 54e. By using this orifice 70, the pressure of the injection air within the air chamber 37 can be kept higher than the set air pressure PA at the timing of emission of compressed air of a pressure higher than that of the set air pressure PA from the air pump 52 at a prescribed time from the emission start timing of the air pump 52. The orifice 70 therefore constitutes a high-pressure maintaining structure for temporarily keeping the injection air pressure at a higher pressure than that of the set air pressure PA at least until a timing coinciding with the injection start timing of the air-fuel injection valve 30. Further, pulsing of the compressed air guided by the air pressure regulator 53 is suppressed by the orifice 70 and the precision of the regulating function of the air pressure regulator 53 is improved.

Further, by arranging the pipe 68 on the exhaust side of the cylinder 2 and forming the head-side air passage 54b and the cover-side air passage 54c on the exhaust side of the cylinder head 3 and the exhaust side of the valve cover 4 respectively, of the air passage system 54, the air passages 54a, 54b and 54c reaching the air chamber 37 from the air pump 52 can be provided on the exhaust side of the cylinder head 3 and the exhaust side of the valve cover 4 for which the temperature is high compared with the intake side because of exhaust gas flowing through the exhaust port 10.

Operation of the Air-fuel Injection Valve

Next, a description is given of control of the air-fuel injection valve 30, using the discharge timing TA of compressed air from the air pump 52 and the ECU 80 with reference to FIG. 1, FIG. 3, FIG. 9 and FIG. 10.

Referring to FIG. 1, detection signals from an engine state sensor are received and monitored. The engine state sensor may be a rotary speed sensor 81 for detecting rotation speed of the crankshaft 5, and thereby detecting rotary speed Ne of the internal combustion engine E, a load sensor 82 for detecting opening of a throttle valve provided at the intake device constituting load sensor for detecting engine load, a top dead center sensor 83 for detecting rotary position of the rotating shaft 55 by detecting top dead center of a compression stroke of the internal combustion engine E, a starting sensor 84 constituting starting sensor for detecting when the internal combustion engine E is in a starting state, a coolant temperature sensor 85 constituting engine temperature sensor for detecting engine temperature, an ignition switch 86 for putting an ignition circuit for controlling energizing of the spark plug 14 in an operating state or a non-operating state, and a idle sleep switch 87 for putting the ignition circuit in an operating state or non-operating state constituting idling stop detection means for detecting operation or non-operation of the idling stop control device for putting the internal combustion engine E in a halted state at times of temporary stopping such as at an intersection etc. are inputted to the ECU 80.

Here, the starting state of the internal combustion engine E is an operating state from a starting timing where a starting motor (not shown) taken as starting means is made to operate by a starting switch being put in an on state so that the crankshaft 5 currently in a stationary state starts to rotate to a starting completion timing where the internal combustion engine E is in a purely combustive state. In this embodiment, the starting sensor 84 is configured so as to utilize a rotary speed sensor 81, with the starting state taken to be when the engine rotary speed Ne is within the range of rotary speed from zero for a starting commencement timing to the engine rotary speed Ne at the timing where starting is complete.

Further, control programs for controlling injection timing TF of injection of fuel injected from the fuel injector 31 and the amount of fuel (here, this is equivalent to the valve opening time) and controlling the injection timing TM and injection amount (which in this case is equivalent to the valve opening time) of injection timing TM and injection amount of the air-fuel mixture injected from the charge injection valve 32, i.e. from the air-fuel injection valve 30 and various maps, with the ECU 80 controlling the air-fuel injection valve 30 in accordance with these control programs.

Control Routines

In the following, a description is given with reference to FIG. 3, FIG. 9 and FIG. 10 of control of the air-fuel injection valve 30 at the time of the starting state of the internal combustion engine E. Referring to the flowchart of FIG. 9 for illustrating the control routine for the time of starting of the air-fuel injection valve 30, in step S1, a halt time determination flag Ft is set to 1 at the time of starting up this routine in order to carry out a determination in a step S6 once.

Next, in step S2, a determination is made as to whether or not the ignition circuit is in an operating state, i.e. as to whether or not the ignition switch 86 and the idle sleep switch 87 are both on, and when this determination is negative the routine is ended. When the idle sleep switch 87 is on, the idling stop control device is in a non-operating state, and an idling stop is not carried out. When the idle sleep switch 87 is in an off state, the ignition circuit is in a non-operating state and the idling stop control device is in an operating state, so that idling is temporarily stopped. When the determination of step S2 is affirmative, the rotary speed Ne of the engine detected by the rotary speed sensor 81 is read-in in step S3. Before commencement of starting, the engine rotary speed Ne is zero.

Proceeding to step S4, a determination is made as to whether or not the internal combustion engine E is in a starting state based on a detection signal from the starting sensor 84. When this determination is negative, the internal combustion engine is operating in a state other than a starting state. Step S15 is then proceeded to and a determination is made as to whether or not the ignition circuit is in a non-operating state due to the ignition switch 86 and the idle sleep switch 87 being in off states. When this determination is negative, the internal combustion engine E is in an operating state, step S3 is returned to and execution of the processing of this routine continues to be executed.

When the determination of step S4 is affirmative, when the internal combustion engine E is in the starting state, step S5 is proceeded to and flag Ft is referred to. When flag Ft is set to 1 so that it is necessary to determine whether or not the stop time t is within a prescribed stop time t1, step S6 is proceeded to. When the determination of step S5 is negative, determination of the stop time t has already been executed. Step S11 is then proceeded to and a determination is then made as to whether or not control during starting of the injection timing TM (refer to FIG. 10) of the air-fuel injection valve 30 is to be carried out.

In step S6, a determination is made as to whether or not stop time t detected by a timer constituting time sensor for detecting the stop time of the internal combustion engine E from the stop timing of the previous time to the starting commencement timing of this time is within a prescribed stop time t1 corresponding to the state where the pressure of the injection air is greater than the basic air pressure PA0. This timer is also constituted by the engine state sensor for detecting engine states of the internal engine E.

The pressure of the injection air gradually falls as the stop time t elapses due to leaking of compressed air from slight gaps in the air supply system 50 formed of the cylinder 2, cylinder head 3, and valve cover 4 etc. due to the operation of the air pump having stopped at the time of stopping the internal combustion engine E. The basic air pressure PA0 is the lowest possible pressure capable of enabling injection of the air-fuel mixture from the air-fuel injection valve 30 on the compression stroke.

Therefore with normal temporary stopping of the internal combustion engine E and idling stops etc., at the time of a restarting operation within a short time after stopping the internal combustion engine E, the stop time t is comparatively short. The fall in pressure of the injection air is therefore substantially non-existent or small, and the pressure of the injection air is greater than the basic air pressure PA0. Because of this, after a stop time that is a short time such as for an idling stop, when the internal combustion engine E is re-started, the determination in step S6 is affirmative, and step S8 is proceeded to after the flag Ft is set to zero in step S7. In step S8, the injection air is of a pressure greater than the basic air pressure PA0 and injection of the air-fuel mixture in the compression stroke is possible and it is therefore not necessary to inject the air-fuel mixture on the intake stroke. A starting time control flag Fs can then be set to zero in order to indicate that control during starting of the injection timing TM is not executed.

As the stop time t is long, time corresponding to the state where the pressure of the injection air is lower than the basic air pressure PA0 elapses. Therefore, when the determination of step S6 is negative, in step S9, the flag Ft is set to zero, and step S10 is proceeded to. In step S10, the injection air is at a pressure lower than the basic air pressure PA0 and injection of the air-fuel mixture at the time of the compression stroke is difficult. Flag Fs is then set to 1 in order to indicate that control during starting is executed to set the injection timing TM at the intake stroke, and step S11 is proceeded to.

Then, in step S11, when the flag Fs is 1, step S12 is proceeded to and a determination is made as to whether or not the engine rotary speed Ne has reached a prescribed engine rotation speed Ne1. This prescribed engine rotary speed Ne1 is the engine rotary speed Ne corresponding to when the pressure of the injection air within the air chamber 37 reaches the basic pressure PA0 and is set in advanced based on experimentation etc.

When the determination of step S12 is negative, i.e. when it is determined that the pressure of the injection air within the air chamber 37 has not reached the basic air pressure PA0, step S113 is proceeded to, and the injection timing TM of the air-fuel injection valve 30 is only set for the intake stroke. As shown in FIG. 10(A), in advance of the injection timing TM, fuel injected at an injection timing TF from the fuel injector 31 is injected in the direction of the combustion chamber 8 which is at negative pressure due to being at an intake stroke together with the injection air one time every cycle of the internal combustion engine E. As a result of the injection of the air-fuel mixture on this intake stroke, a substantially homogenous air-fuel mixture is formed within the whole of the combustion chamber 8 up to the ignition timing Ti prior to the compression top dead center point, and this homogenous air-fuel mixture can then be combusted in a homogenous manner.

More specifically, when one cycle is carried out in the order of an intake stroke, a compression stroke, an expansion stroke and an exhaust stroke, at each cycle, the injection timing TF of the fuel injector 31 is set to the first half of the exhaust stroke, and the injection timing TM (the injection timing of the charge injection valve 32) of the air-fuel injection valve 30 is set to be a timing that is slower than the injection timing TF and is set here to the first half of the intake stroke.

At this time, when a long period of time has elapsed from the internal combustion engine E being stopped to the extent that the air pressure within the air chamber 37 becomes equal to the atmospheric pressure of the outside air due to leaking of compressed air from slight gaps in the air supply system 50, at the injection timing TF on the current cycle shown in FIG. 10(A), fuel injected from the fuel injector 31 is injected into the combustion chamber 8 together with the injection air having an increased air pressure for the previous cycle and injection air having air pressure equal to the atmospheric pressure at the time of the initial cycle after the current cycle commences starting. At the cycle for this time, compressed air discharged at the discharge timing TA of the air pump 52 set to span from the first half of the compression stroke to the second half is such that the pressure of the injection air within the air chamber 37 is raised, and the raised injection air is injected into the combustion chamber 8 together with the fuel on the next cycle. In the case where time that elapses from when the internal combustion engine E is stopped is not to the extent that the air pressure within the air chamber 37 becomes equal to the atmospheric pressure, the air-fuel mixture is injected using injection air of a pressure higher than the atmospheric pressure from commencement of starting.

As a result of using the series of steps of step S4 to S6, and S9 to S13, when the air pressure of the injection air becomes lower than the basic air pressure PA0 and the internal combustion engine E then commences starting with the stop state having spanned a length of time sufficient, for example, for the air pressure of the injection air to become equal to the atmospheric air pressure, the compression timing TM can always be set to the intake stroke.

When the determination of step S12 is affirmative, the injection air pressure is greater than the basic air pressure PA0. Step S14 is then proceeded to, and the injection timing TM of the air-fuel injection valve 30 is switched over from the intake stroke to the compression stroke, and set to the compression stroke. As shown in FIG. 10(B), in advance of the injection timing TM, fuel injected at an injection timing TF from the fuel injector 31 is injected in the direction of the combustion chamber 8 which is at negative pressure due to being at an intake stroke together with the injection air one time every cycle of the internal combustion engine E. At this time, air-fuel mixture injected from the air-fuel injection valve 30 mostly collects within the cavity 6a, and in order to prevent or suppress dispersion at the combustion chamber 8, stratified combustion is carried out so as to combust the air-fuel mixture with an air-fuel mixture of good combustibility existing in the vicinity of the spark plug 14 with an air layer that does not include fuel being present at the periphery of the cavity 6a.

More specifically, at each cycle, discharge timing TF of the fuel injector 31 is set to a higher timing than the discharge timing TA of, for example, the latter half of the intake stroke, with respect to the discharge timing TA of the air pump 52 set spanning from the former half of the compression stroke to the latter half. The discharge timing TM of the air-fuel injection valve 30 (also the discharge timing of the charge injection valve 32) is a timing partially overlapping with the discharge period TA, does not overlap with the discharge timing TA, and is set to the latter half of the compression stroke at a timing that is slightly slower than the discharge timing TA. In either case, the injection timing TM is set to overlap with a timing period such that the pressure of injection air within the air chamber 37 is held at a state higher than the set air pressure PA.

In the starting state, the engine state from the commencement of starting until a prescribed engine rotary speed Ne1 is reached is a first engine state corresponding to a state where the pressure of the injection air is less than the basic air pressure PA0. At the time of this first state, the injection timing TM of the air-fuel injection valve 30 is set to the intake stroke. In the starting state, the engine state when the prescribed engine rotary speed is Ne1 or more is a second engine state corresponding to a state where the pressure of the injection air is the basic air pressure PA0 or more. At the time of this second state, the injection timing TM of the air-fuel injection valve 30 is set to the compression stroke.

In relation to step S4, when the internal combustion engine E operates in a state other than at the time of starting, the injection period TM is set at the compression stroke or the intake stroke according to the engine state by the ECU 80. For example, directly after completion of starting of the internal combustion engine E, the injection timing TM of the air-fuel injection valve 30 is set to the latter half of the compression stroke as shown in FIG. 10(B) in a partial running region of the internal combustion engine E such as during idling and low-speed or low-load running, and stratified combustion is carried out. Further, in a separate running region of the internal combustion engine E for the time of high-speed or high-load running of the internal combustion engine E etc., the injection timing TM of the air-fuel injection valve 30 is set to the intake stroke, a substantially homogeneous air-fuel mixture is formed in the whole of the combustion chamber 8, and uniform combustion is carried out.

When the determination of step S4 is negative and the determination of step S15 is affirmative, then running of the internal combustion engine E has stopped, with this including idling stops. At this time, step S16 is proceeded to, and after the timer is reset, a count is started, and this routine ends. Then, the processing from step S3 to step S14 is executed every prescribed period by the ECU 80 until the determination of step S4 is negative due to starting being complete.

The following is a description of the operation and effects of the embodiment with the configuration described above. In an internal combustion engine E equipped with the air pump 52 driven by the power of the air-fuel injection valve 30 and the crankshaft 5 and an ECU 80 for setting the injection timing TM of the air-fuel injection valve 30 to the intake stroke or the compression stroke according to the engine state detected by the engine state sensor, when starting of the internal combustion engine E is detected by the starting sensor 84, the ECU 80 executes control at the time of starting for setting the injection timing TM to the intake stroke so that at the time of starting the internal combustion engine E, an air-fuel mixture is injected from the air-fuel injection valve 30 at the time of the intake stroke where the pressure within the combustion chamber 8 when the speed of the engine Ne becomes low so that the pressure of the injection air raised in pressure by compressed air discharged from the air pump 52 driven by the power of the crankshaft 5 is not of sufficiently high pressure to inject the air-fuel mixture on the compression stroke. At this time, in addition to there being a negative pressure state within the combustion chamber 8, the injection air has a pressure that is higher than the relatively low pressure of atmospheric air as a result of the compressed air being supplied from the air pump 52 and the difference in pressure between the pressure of the fuel air mixture within the air-fuel injection valve 30 and the pressure within the combustion chamber 8 is therefore large so as to promote atomizing of the fuel within the combustion chamber 8. A powerful airflow is therefore formed within the combustion chamber 8 by high-pressure injection air injected together with the fuel from the air-fuel injection valve 30 at the time of the compression stroke so as to promote atomizing of the fuel. Superior combustibility can therefore be attained and a stratified combustion operation is possible.

As a result, atomizing of the fuel within the combustion chamber 8 is promoted, combustibility during starting is improved, and starting performance is also improved using simple control where the injection timing TM is changed to the intake stroke when starting of the internal combustion engine E is detected. Further, the air pressure within cylinder hole 2a at the time of the compression stroke is utilized in air injection and there is substantially no fear of the air path within the air-fuel injection valve 30 becoming blocked up due to deposits. Further, by setting the injection timing TM of the air-fuel injection valve 30 to the compression stroke, superior combustibility is obtained, and stratified combustion is possible.

When a prescribed engine rotary speed Ne1 corresponding to the pressure of injection air reaching a basic pressure PA0 where injection of the air-fuel mixture in the compression stroke is possible is detected by the rotary speed sensor 81 constituting the engine state sensor used for calculating fuel amount of the air-fuel injection valve 30 and injection timing period, the injection timing TM is switched over from the intake stroke to the compression stroke when the pressure of the injection air reached the basic air pressure PA0 based on detection results of the rotary speed sensor 81 without using a pressure sensor to detect pressure of the injected air and fuel atomizing is carried out using injection air of a pressure in excess of the basic air pressure PA0.

A pressure sensor is therefore not required to detect pressure of the injection air, costs can be reduced, and atomizing of fuel can be carried out using high-pressure injection air so as to ensure good starting performance.

When the halt time detected by the timer when starting of the internal combustion engine E is detected is within a prescribed halt time t1 corresponding to a state where the injection air pressure is greater than the basic air pressure PA0, the ECU 80 sets the injection timing TM to the compression stroke. When the halt time t exceeds the prescribed halt time t1 as a result of execution of control at the time of starting, the halt time t from the running halt timing for the previous time of the internal combustion engine E to the running start period for this time is within the prescribed halt time t. Fall in pressure of injection air due to leaking of compressed air from minute gaps in the air supply system 50 and air chamber 37 from the air pump 52 to the air-fuel injection valve 30 is almost non-existent or small. The air-fuel mixture can therefore be injected on the compression stroke when the pressure of the injection air at the commencement of starting timing is greater than the basic air pressure PA0 without executing control at the time of starting. A powerful airflow is therefore formed within the combustion chamber 8 by injection air of a pressure greater than the basic air pressure PA0 and fuel atomizing is promoted. It is therefore possible to obtain superior combustibility and stratified combustion operation is possible directly after the start of starting-up.

As a result, even when the internal combustion engine E is in a starting state, when activation of starting is within a short time after temporary halting such as an idling stop, i.e. when the halt time t is within the prescribed halt time t1 injection of an air-fuel mixture is carried out using high-pressure injection air without exerting control at the time of starting and combustibility is improved. Superior starting performance is therefore ensured, and the starting period for running in stratified combustion can be made faster so as to dramatically improve combustion.

The discharge section 52g and pipe 68 of the air pump 52 are arranged next to the exhaust side of the cylinder head 3, and the head-side air passage 54b and cover-side air passage 54c are arranged at the exhaust side of the cylinder head 3 and at the exhaust side of the valve cover 4 respectively. As a result, the air passages 54a, 54b, and 54c of the air passage system 54 guiding compressed air discharged from the air pump 52 are arranged at the exhaust side of the cylinder head 3 and the exhaust side of the valve cover 4 which are at a comparatively high temperature compared to the intake side for exhaust gas flowing into the exhaust port 10. When compressed air that is compressed by the air pump 52 so as to rise in temperature flows through the air passages 54a, 54b and 54c, falls in the temperature of the compressed air are suppressed, and it is possible to maintain the temperature of the compressed air.

As a result, when compressed air flows through the air passage system 54, the occurrence of condensation due to contact with passage walls that are at a lower temperature than the temperature of the compressed air is prevented or suppressed, and the temperature of the injection air within the air chamber 37 can be kept relatively high. The vaporization of fuel at the time of starting is therefore promoted and starting performance is also improved in this respect.

The whole of the pump cover 52b and the discharge section 52g is positioned further to the side of the connecting surface 3d of the cylinder 2 of the cylinder 3, the uppermost part of the pump chamber 52e is positioned substantially above the connecting surface 3d, and the whole of the air chamber 37 is positioned further towards the air pump 52 than the fuel chamber 36. As a result, the air passages 54a, 54b and 54c reaching the air chamber 37 from the discharge section 52g of the air passage system 54 can be made small and can be arranged collectively at and close to the exhaust side of the cylinder head 3 where the exhaust port 10 is formed. The effect of retaining heat in the compressed air at the air passages 54a, 54b and 54c reaching the air chamber 37 from the air pump 52 of the air passage system 54 can therefore be improved. As a result, this contributes to keeping the temperature of the injection air comparatively high, vaporizing of fuel during starting is promoted, and starting performance is improved.

By providing an orifice 70 constituting a high-pressure maintaining structure for temporarily keeping the pressure of the injection air at a pressure higher than the set air pressure PA at least until where timing overlaps with the injection start timing of the air-fuel injection valve 30 at the air passage system 54, fuel is injected together with injection air of a pressure higher than the set pressure PA at the injection timing TM and atomizing of fuel within the combustion chamber 8 is therefore promoted.

As a result, when the discharge timing TM during starting is set to the compression stroke, atomizing of fuel within the combustion chamber is further promoted, and the starting performance is improved accordingly.

Following is a description of the embodiment with a modified configuration of part of the configuration of the embodiment mentioned above. In the above embodiment, the timing of switching the injection timing TM from the intake stroke to the compression stroke is decided based on the engine rotary speed Ne. However, as shown in FIG. 11, this may also be decided based on an injection number Ni of the air-fuel injection valve 30 rather than on the engine rotary speed Ne.

In a flowchart showing a control routine for control during starting of FIG. 11, processing of step S3 and step S12 of the flowchart of FIG. 9 are replaced with a process of step S23 and step S32, with other aspects of the processing being the same as for the flowchart of FIG. 9.

Specifically, in step S23, a count for an injection frequency Ni of the air-fuel injection valve 30 is started from when the ignition circuit enters an operating state. In step S32, a determination is made as to whether or not Ni is less than or equal to a prescribed injection number Ni1. The prescribed injection frequency Ni1 is the frequency of injection Ni corresponding to when the pressure of the injection air within the air chamber 37 reaches the basic pressure PA0 and may be a plurality of prescribed numbers such as, for example, 4 to 10, set in advance based on experimentation etc.

When the determination of step S32 is negative, i.e. when it is determined that the pressure of the injection air has not reached the basic air pressure PA0, step S13 is proceeded to, and the injection timing TM of the air-fuel injection valve 30 is only set for the intake stroke. Further, when the determination of step S12 is affirmative, the pressure of the injection air is the basic pressure PA0 or more that is capable of injection of the air-fuel mixture on the compression stroke. Step S14 is then proceeded to, and the injection timing TM of the air-fuel injection valve 30 is switched over from the intake stroke to the compression stroke, so as to be set to the compression stroke.

Injection frequency sensor for detecting the frequency of injection Ni is configured from part of the ECU 80 executing the processing in step S23, and the injection frequency sensor also constitutes the engine state sensor.

According to the internal combustion engine equipped with the injection frequency sensor, the injection timing TM is changed over from the intake stroke to the compression stroke when the pressure of the injection air reaches the basic air pressure based on detection results of the injection frequency sensor without using a pressure sensor for detecting pressure of the injection air so that fuel atomizing is carried out using high-pressure injection air. This gives the same results as for the embodiment where whether or not the basic pressure PA0 is reached is determined based on the engine rotary speed Ne.

The starting sensor 84 may also start calculating timing during starting using the on or off state of a starting switch rather than the rotary speed sensor 81 or a configuration using a timer where time runs out after a prescribed period of time has elapsed may also be adopted. Further, a recoil starter may also be used as starting means.

In the above embodiment, the injection timing TM of the air-fuel injection valve 30 during high-speed or high-load running of the engine E is set only to the intake stroke but may also be set to the intake stroke and the compression stroke respectively. In this case, the fuel amount corresponding to the running state is provided to the combustion chamber 8 separated between the intake stroke and the compression stroke.

A charge-injected internal combustion engine according to the present invention may also be a multi-cylinder internal combustion engine. Further, the internal combustion engine may be mounted on vehicles other than motorcycles, and in addition to motorcycles, may also be used as an outboard motor, as a small engine to run a or as other equipment.

Although the present invention has been described herein with respect to a number of specific illustrative embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

We claim:

1. A charge-injected internal combustion engine, comprising:
   a base engine comprising a crankshaft;
   an air-fuel injection valve operatively attached to the base engine for injecting an air-fuel charge into a combustion chamber thereof;
   an air pump driven by the crankshaft for discharging compressed air for use as combustion air;
   an injection timing controller for setting injection timing of the air-fuel injection valve, and
   an engine state sensor for detecting a state of the internal combustion engine,
   wherein the controller normally sets the injection timing to the compression stroke of the internal combustion engine according to the engine state detected by the engine state sensor, and when an initial starting condition of the internal combustion engine is detected by the engine state sensor, the injection timing is temporarily switched to the intake stroke of the internal combustion engine.

2. The charge-injected internal combustion engine of claim 1, wherein the engine state sensor comprises rotary speed sensor for detecting rotary speed of the engine, so that during starting control, when the engine is detected by the rotary speed sensor to have reached a threshold engine rotating speed corresponding to reaching of a basic air pressure in the air pump, where injection of an air mixture is possible in the compression stroke, the controller switches over the injection timing from the intake stroke to the compression stroke.

3. The charge-injected internal combustion engine of claim 1, wherein the engine state sensor comprises an injection frequency sensor for detecting injection frequency of the air-fuel injection valve, so that during starting control, when the injection frequency is detected by the injection frequency sensor to have reached a threshold injection frequency, corresponding to reaching of a basic air pressure where injection of an air mixture is possible in the compression stroke, the controller switches over the injection timing from the intake stroke to the compression stroke.

4. The charge-injected internal combustion engine of claim 1, wherein the engine state sensor comprises time sensor for detecting a time of halting the internal combustion engine, so that when the halt time detected by the time sensor is within a prescribed halt time corresponding to a state where pressure of the injection air is greater than a basic air pressure where injection of the air mixture is possible in the compression stroke when starting of the internal combustion engine is detected by the engine state sensor, the controller sets the injection timing to the compression stroke, and when the halt time exceeds the prescribed halt time, control during starting is executed.

5. A method of operating a charge-injected internal combustion engine, comprising the steps of:

determining a state of the engine by monitoring signals from at least one engine state sensor;

setting the charge injection timing to coincide with an intake stroke of the internal combustion engine when a state of the engine corresponding to a cold startup condition is detected; and switching the charge injection timing from the intake stroke to a compression stroke when a warmed-up state of the engine is sensed, corresponding to reaching of a threshold air pressure present in an intake air duct.

6. The method of claim 2, wherein the at least one engine state sensor comprises a sensor selected from the group consisting of engine rotary speed sensors, coolant temperature sensors, timers, engine starting sensors, and injection frequency sensors.

* * * * *

UNITED STATES PATENT AND TRADEMARK OFFICE
CERTIFICATE OF CORRECTION

PATENT NO.    : 6,955,161 B2
DATED         : October 18, 2005
INVENTOR(S)   : Masatoshi Suzuki et al.

It is certified that error appears in the above-identified patent and that said Letters Patent is hereby corrected as shown below:

Column 3,
Line 46, change "a third aspect hereof the" to -- a third aspect hereof, the --.

Column 13,
Line 10, change "step S113" to -- step S13 --.

Signed and Sealed this

Twenty-eighth Day of February, 2006

JON W. DUDAS
*Director of the United States Patent and Trademark Office*